D. H. BRINKMAN.
SPRING WHEEL.
APPLICATION FILED MAY 7, 1912.
1,068,408.
Patented July 29, 1913.
2 SHEETS—SHEET 1.
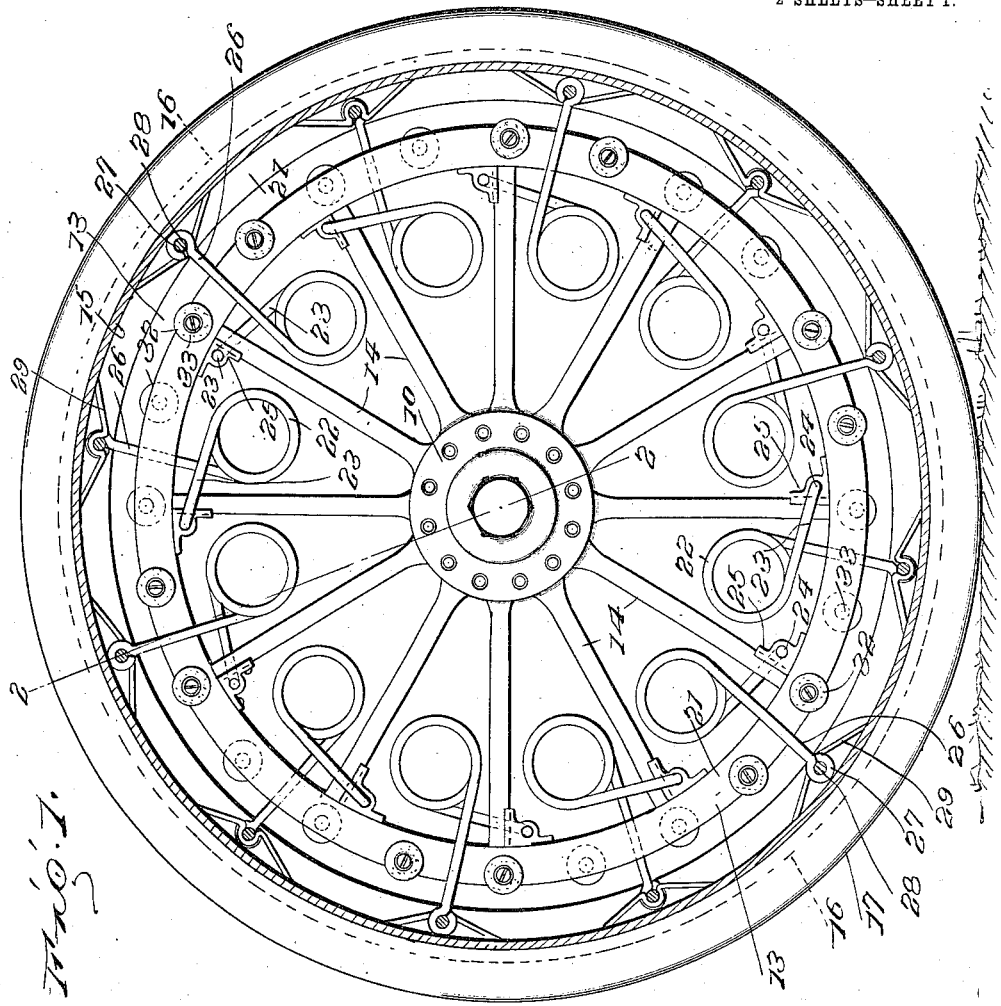
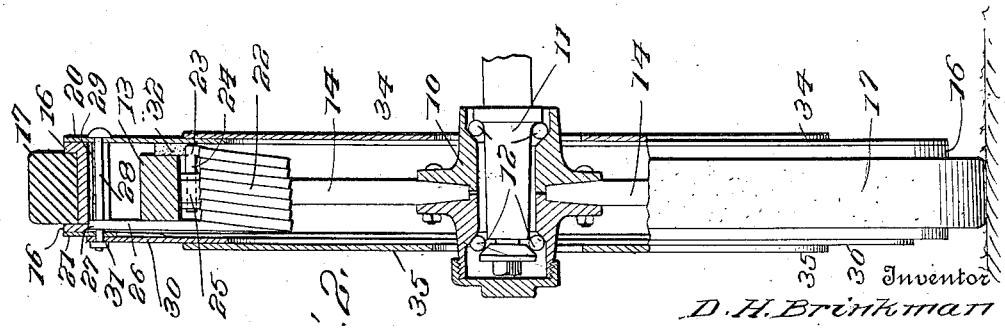
Witnesses
Inventor
D. H. Brinkman
By
Attorneys

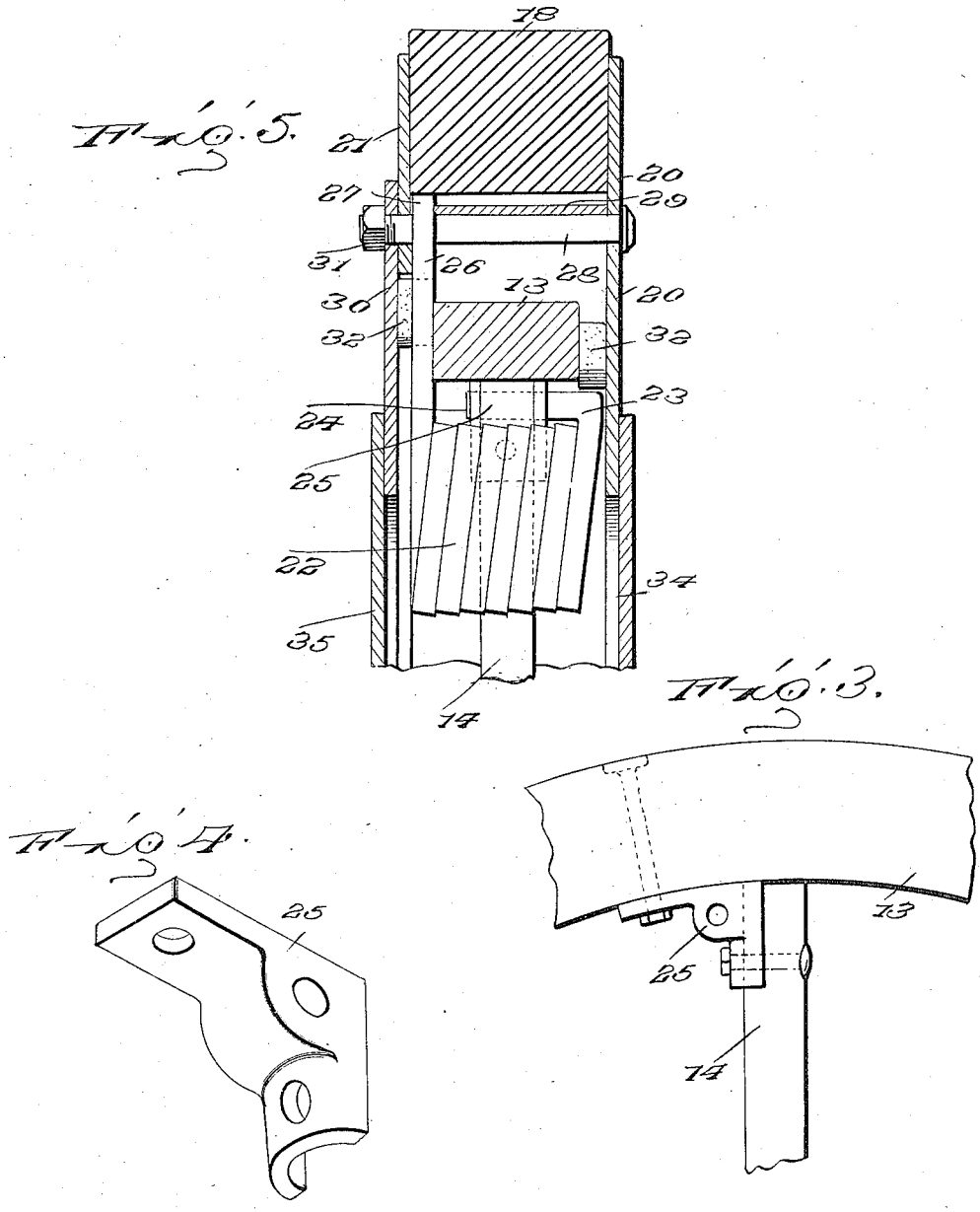

UNITED STATES PATENT OFFICE.

DIRK H. BRINKMAN, OF SHELDON, IOWA.

SPRING-WHEEL.

1,068,408.  Specification of Letters Patent.  Patented July 29, 1913.

Application filed May 7, 1912. Serial No. 695,706.

*To all whom it may concern:*

Be it known that I, DIRK H. BRINKMAN, citizen of the United States, residing at Sheldon, in the county of O'Brien and State of Iowa, have invented certain new and useful Improvements in Spring-Wheels, of which the following is a specification.

This invention relates to improvements in vehicle wheels, more particularly to the class of spring wheels, or wheels constructed with yieldable rim portions, and has for one of its objects to simplify and improve the construction and increase the efficiency and utility of devices of this character.

Another object of the invention is to provide a simply constructed wheel wherein the parts are separable for the renewal of impaired or broken parts without discarding the remaining portions of the wheel, and without the necessity of removing the wheel from the axle.

Another object of the invention is to provide a wheel wherein the parts coact to support each other and produce a constant uniform tension and pressure and wherein one portion coacts with the other to prevent unequal strains or pressures.

Another object of the invention is to provide a device of this character which may be applied to ordinary vehicle wheels without material structural change therein, or so arranged that it can be readily applied to ordinary vehicle wheels and transform the same into effectual spring wheels.

With these and other objects in view, the invention consists in certain novel features of construction as hereafter shown and described, and then specifically pointed out in the claims, and in the drawings illustrative of the preferred embodiment of the invention: Figure 1 is a side elevation, partly in section; Fig. 2 is a section on the line 2—2 of Fig. 1; Fig. 3 is an enlarged detail illustrating the construction and application of one of the spring-holding brackets; Fig. 4 is a detached perspective view of one of the spring-holding brackets; Fig. 5 is an enlarged detail illustrating a modification in the construction.

Corresponding and like parts are referred to in the following description and indicated in all the views of the drawings by the same reference characters.

The improved device is designed more particularly to replace the ordinary pneumatic tires of automobiles and like vehicles, but may be employed without material structural change on vehicle wheels of various kinds, but for the purpose of illustration is shown applied to an automobile wheel, and embraces a hub portion 10 mounted for rotation upon an axle journal 11 and preferably provided with anti-friction balls 12 of any suitable form and arrangement. The improved wheel likewise comprises a main felly or inner rim 13, connected to the hub by a plurality of spokes 14. Surrounding the main rim 13 and spaced therefrom is an outer rim 15 and preferably with annular flanges 16 to support a tire 17, of rubber of substantially the usual form. The improved device may also be applied directly to an ordinary wood rim 18 without material structural change in the device, as shown in Fig. 5.

When the yieldable tire 17 is employed as shown in Figs. 1 and 2, one of the flanges 16 will be bolted or otherwise detachably secured to the rim to enable the tire to be located upon the rim or removed therefrom when required. Attached to one of the side faces of the rim 15, or to the rim 18 as the case may be, preferably to the inner face, is an annular plate 20 which extends inwardly over the felly 13 for a considerable distance as shown. Attached to the opposite face of the rim 15, or 18, as the case may be, is another annular plate 21, which is of less width than the plate 20, and thus reaches a shorter distance inwardly as shown. The rim 15 or 18 as the case may be, is located a short distance beyond the main felly 13, and the rim 21 reaches for a portion of the distance between the rim and felly, as shown. Located between each pair of the spokes 14, is a coil spring 22, preferably of square steel wire of sufficient strength to withstand the strains to which it will be subjected. One end 23 of each spring is extended into substantially parallel relations to the inner face of the main felly 13, or past the adjacent spoke 14, and thence turned at right angles to the felly, as shown at 24, and supported in position by a corner bracket 25 bolted respectively to the spoke and to the main felly. The terminal 24 of the spring is rigidly secured in the bracket and the bracket rigidly secured to the body of the wheel, as shown. The opposite end 26 of each spring is extended outwardly alongside the felly 13 and terminates in an eye 27 through which a bolt 28 passes, the terminals of the bolt being secured respectively to the plates 20 and 21. A sheet metal stop 29 is disposed between the bolt 28 and the rim 15 or 18, as the case may be, and serves to prevent lateral displacement of the spring. The terminals 24 and 26 of the springs are arranged to bear alternately upon opposite sides of the spokes 14, and the felly 13 as shown and thus protect the spokes and felly from lateral strain or concussion. Bearing upon the plate 21, is an annular guard or shield 30, which is apertured to fit over the bolts 28, and thus be secured in position by the same nuts 31 by which the bolts are secured. At its inner edge the plate 30 corresponds to and is in alinement transversely of the wheel with the inner edge of the plate 20.

The felly 13 is of less width than the rims 15 or 18 as the case may be, leaving spaces between the felly and the plates 20 and 30, and connected to the opposite faces of the felly and next to the plates 20 and 30, are a plurality of buffer devices, preferably blocks or washers of rubber or like material 32, and secured in position by screws or other devices 33, the heads of the screws being countersunk within the washers so that the holding devices will not come in contact with the plates 20 or 30. The buffer devices serve several important purposes. They protect the springs against jars or concussions when the vehicle is suddenly started or stopped, or when pulling out of a depression, or whenever much power is required when starting. It will thus be noted that the buffer devices are an important element of applicant's invention. By this simple means the outer rim 15—17 or 18 as the case may be, is yieldably coupled to the body of the wheel at as many points as there are spokes in the wheel. In the drawings twelve spokes are shown, but it will be obvious that when a greater number of the spokes are employed, a correspondingly greater or lesser number of the springs and brackets will be employed.

If preferred an annular guard plate 34 may be connected to the annular plate 20, and a similar guard plate 35 connected to the annular plate 30, the latter plates being provided with apertures sufficiently large to permit the usual movement of the hub when the weight is applied to the spring-supported tire. By this simple means it will be obvious that a very effectual, simple and cheaply constructed spring wheel is produced which is strong and durable, can be applied without material structural changes to wheels of various forms and sizes, and is equally applicable to ordinary vehicle wheels or to wheels having ordinary rubber tires, by detaching the pneumatic tire and applying the improved tire construction. Thus an ordinary vehicle wheel can be very quickly transformed into an effectual spring wheel without materially increasing the diameter.

It will be obvious that by this construction all of the springs are under constant strain, consequently they are all constantly operative when strain is applied to the wheel and the strain is also equal and uniform at all times entirely around the wheel, and none of the springs are ever quiescent or inoperative. This is also an important advantage and materially increases the efficiency and utility. When the wooden rim 18 is employed, the latter can be renewed cheaply and quickly when worn without discarding the remainder of the wheel.

Having thus described the invention, what is claimed as new is:

1. The combination with a wheel including a felly and connecting spokes, of a clip device connected to each spoke and to the adjacent portion of the felly and binding the felly to the spokes, an outer rim spaced from the felly, a spring located between each pair of spokes, one end of each spring being extended beyond the felly, means for coupling each of said extended spring portions to the rim, and means for coupling the other end of each spring to one of the clip devices.

2. The combination with a wheel including a felly and connecting spokes, of an outer rim spaced from the felly, annular plates connected to said rim and bearing over said felly, clamp bolts extending through said plates, a spring located between each pair of the spokes with one end extended beyond the felly and engaging one of said clamp bolts, means for securing the other end of each spring to the felly and to one of the spokes, and a spacer member bearing over each bolt between the spring and the opposite annular plate and extended for engagement with the inner face of the felly at each side of the bolt.

3. The combination with a wheel including a felly and connecting spokes, of an outer rim spaced from the felly and of greater width than the same, annular plates connected to said rim and bearing over said felly, clamp bolts extending through said plates, bumper devices between said felly and one of said plates, a spring located between each pair of said spokes, one end of each spring being extended beyond the felly, means for coupling each of said extended spring portions to the rim, and means for coupling the other end of each spring to the felly and to the spokes.

In testimony whereof I affix my signature in presence of two witnesses.

DIRK H. BRINKMAN. [L. S.]

Witnesses:
 WM. DINSTERMARS,
 GEO. J. FRANK.

Copies of this patent may be obtained for five cents each, by addressing the "Commissioner of Patents, Washington, D. C."